(12) United States Patent
Merritt et al.

(10) Patent No.: US 8,092,012 B2
(45) Date of Patent: Jan. 10, 2012

(54) SINGLE VISION SPECTACLE LENS

(75) Inventors: James S. Merritt, Lebanon, OH (US);
Shyamy Sastry, Roanoke, VA (US); C. Benjamin Wooley, Jacksonville, FL (US); Edgar V. Menezes, Roanoke, VA (US); Amitava Gupta, Roanoke, VA (US)

(73) Assignee: Essilor International (Compagnie Generale d'optique), Charenton le Pont (FR)

( * ) Notice: Subject to any disclaimer, the term of this patent is extended or adjusted under 35 U.S.C. 154(b) by 107 days.

(21) Appl. No.: 12/520,607

(22) PCT Filed: Dec. 22, 2006

(86) PCT No.: PCT/US2006/062563
§ 371 (c)(1),
(2), (4) Date: Oct. 20, 2009

(87) PCT Pub. No.: WO2008/079150
PCT Pub. Date: Jul. 3, 2008

(65) Prior Publication Data
US 2010/0060852 A1    Mar. 11, 2010

(51) Int. Cl.
*G02C 7/02*    (2006.01)
*G02C 7/06*    (2006.01)
(52) U.S. Cl. ......................... 351/159; 351/169
(58) Field of Classification Search .................. 351/169, 351/159, 171
See application file for complete search history.

(56) References Cited

U.S. PATENT DOCUMENTS

| | | | |
|---|---|---|---|
| 6,199,984 B1 * | 3/2001 | Menezes | 351/169 |
| 6,309,067 B1 | 10/2001 | Zeidler | |
| 6,318,859 B1 | 11/2001 | Baudart et al. | |
| 6,883,916 B2 * | 4/2005 | Menezes | 351/177 |
| 7,275,822 B2 * | 10/2007 | Gupta et al. | 351/177 |
| 2002/0180928 A1 | 12/2002 | Ahsbahs et al. | |
| 2003/0174278 A1 | 9/2003 | Esser et al. | |
| 2006/0050236 A1 | 3/2006 | Menezes | |

FOREIGN PATENT DOCUMENTS

WO    WO02/084382    10/2002
WO    WO2005/091054    9/2005

* cited by examiner

*Primary Examiner* — Jordan Schwartz
(74) *Attorney, Agent, or Firm* — Occhiuti Rohlicek & Tsao LLP

(57) ABSTRACT

An improved single lens comprising:
a continuous change in lens curvature going downwards;
a front and a back surfaces;
an upper part which front and back surfaces are top zones of front and back surfaces, covering at least the half of respectively front and back surfaces, and where the two top zones are aligned to each other such that the effective power of the upper part of the lens is constant;
a lower part used for viewing near objects which front and back surfaces are lower zones of front and back surfaces, the front and back lower zones comprising each a surface zone where top to bottom increasing curvature of each surface zone is provided and where the two front and back lower zones are aligned to each other such that the maximum difference of the effective power of the lower part of the lens and the effective power of the upper part of the lens is comprised between 0 and 0.5 Diopter.

13 Claims, 1 Drawing Sheet

SINGLE VISION SPECTACLE LENS

CROSS-REFERENCE TO RELATED APPLICATIONS

This application is the National Stage of International Application No. PCT/US2006/062563, filed Dec. 22, 2006, the content of which is hereby incorporated by reference in its entirety.

BACKGROUND

The invention relates to an improved single vision spectacle lens.

Single vision lenses are prescribed when the patient is either farsighted or nearsighted and have the same focal power throughout (top to bottom).

Vision correction for myopia (nearsightedness) and hypermetropia (farsightedness) can be accomplished using spectacle lenses having appropriate spherical curves on the anterior (outer or front surface) and posterior (inner or back surface on the eye side) surfaces. Astigmatism can also be corrected when using toroidal or spherocylindrical surfaces.

Wearers of single vision lenses who are non-presbyopic have adequate accommodation to be able to bring to focus near objects when provided with the required correction of refractive error. However, the retinal images of near objects are too small in size to provide adequate visual comfort or contrast sensitivity especially at low or controlled illumination conditions, for example when reading a menu in a restaurant, or threading a needle indoors. The size of the focused retinal image is usually expressed in the form of angular magnification or paraxial magnification, in which magnification is defined as the ratio of the retinal image size formed by a particular lens to the image size formed by an emmetropic eye, i.e., an eye requiring no refractive correction. Image magnification may also be defined for one lens configuration relative to another, for example comparing two lenses with different base curves but providing the same spherical correction. Image magnification depends on the magnitude of the spherical for spherical equivalent) correction provided, as shown in equation 1.

$$M = 1/[1 - t \cdot F_1/n] \cdot 1/[1 - d \cdot F_v]$$  Equation 1

Wherein
M is the lens magnification;
t is the lens thickness;
n is the refractive index of the lens material;
$F_1$ is the curvature of the front surface of the lens;
d is the distance from the back vertex, or distance from the point of intersection on the lens of the principal axis, to the entrance pupil of the eye; and
$F_v$ is the back vertex power, or the reciprocal of the distance, in air, from the back surface of the lens to the secondary focal point.

Equation 1 shows that image magnification is higher for plus powers and increases with plus power of a lens.
Equation 1 may be rewritten as $$SM = 1/[1 - (t/n)D_1] \cdot 1/[1 - d \cdot D],$$  Equation 2

Where
SM is the spectacle magnification, defined as the ratio of retinal image size when wearing a lens of power D to the image size in an emmetropic eye;
$D_1$ is the base curve
D is the power of the lens in diopters.

Wearers of single vision lenses, in particular myopes who wear minus power single vision lenses may desire to enhance image magnification for near objects. In prior art single vision lenses, it is not possible to alter image magnification without changing refractive correction. Since single vision lens wearers require single vision lenses of a particular power in order to avoid image blur, they can not be provided a higher level of image magnification without causing them to have blurry vision.

Typically, non-presbyopic wearers of all types of vision correction, including users of single vision spectacle lenses or contact lenses experience reduced contrast sensitivity and visual comfort when viewing near objects, since near vision tasks typically require finer resolution and ability to function in low or controlled illumination environments, e.g., indoors at night.

SUMMARY

Thus, the object of the present invention is to provide an improved single vision lens whereby image magnification is provided for near objects without causing a blurry vision.

This object is solved in accordance with this invention by an improved single lens comprising:
  a continuous change in lens curvature going downwards;
  a front and a back surfaces;
  an upper part which front and back surfaces are top zones of front and back surfaces, covering at least the half of respectively front and back surfaces, and where the two top zones are aligned to each other such that the effective power of the upper part of the lens is constant;
  a lower part used for viewing near objects which front and back surfaces are lower zones of front and back surfaces, the front and back lower zones comprising each a surface zone where top to bottom increasing curvature of each a surface zone is provided and where the two front and back lower zones are aligned to each other such that the maximum difference of the effective power of the lower part of the lens and the effective power of the upper part of the lens is comprised between 0 and 0.5 Diopter.

According to the invention an "improved single lens" is a substantially single vision lens having at least the same focal power on the main part of the lens.

According to the invention, "the main part of the lens" corresponds to at least 75% of the surface of the lens.

The topography of the lens curvature may be designed to follow the path of natural gaze while viewing near objects.

According to an embodiment of the present invention, the maximum difference of effective power of the lower part of the lens and the effective power of the upper part of the lens is equal or less to 0.3 Diopter.

According to an embodiment of the present invention, front and back surfaces are aligned to each other such that the effective power of the whole lens is constant.

According to an embodiment of the present invention, front and back lower zones comprise each an intermediate zone and a bottom zone where the curvature of both front and back zones follows a top to down increasing curvature gradient; a preferred gradient is a linear gradient.

According to the preceding embodiment, the gradient in surface curvature is less or equal to 3 Diopters.

According to an embodiment of the present invention, the bottom zones are zones of constant focal power.

According to an embodiment of the present invention, the height $h_1$ of top zone, the height $h_2$ of intermediate zone, the height $h_3$ of bottom zone of the front surface are respectively equal to the height $h_1$ of top zone, the height $h_2$ of intermediate zone, the height $h_3$ of bottom zone of the back surface.

According to preceding embodiment, $h_1$ is comprised between 50 to 70% of the total height h of the lens, $h_2$ is comprised between 5 to 20% of the total height h of the lens, $h_3$ is comprised between 20 to 40% of the total height of the lens.

According to another embodiment of the present invention, the front and back surfaces are progressive surfaces comprising each a top far vision zone, an intermediate vision zone and a bottom near vision zone, the surfaces being adjusted so that the resulting lens power is held to a nominal value.

According to preceding embodiment, the front and back progressive surfaces each comprise a steep curvature zone being disposed along a central meridian so as the steepening curvature profile matches the charge in gaze direction as the eyes move from a distant target to a near target.

According to an embodiment of the present invention, the lens is spherical or toric or aspheric.

According to an embodiment of the present invention, the lens is a minus lens for nearsightedness correction, with negative effective power.

According to another embodiment of the present invention, the lens is a plano lens with 0 Diopter effective power.

According to another embodiment of the present invention, the lens is a plus lens for farsightedness correction with positive effective power.

In the frame of the present invention, it has to be understood that a Diopter power value is constant when its variation on a surface is equal or less to 0.1 Diopter.

In the frame of the present invention, it has to be understood that a height value is equal to another when the difference between the heights is equal or less to 1 mm.

BRIEF DESCRIPTION OF THE DRAWINGS

The present invention is illustrated by way of examples and not limited by the accompanying figures, in which like references indicate similar elements, and in which.

DETAILED DESCRIPTION

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

According to the present invention, the wordings "top" or "up", "bottom" or "down" indicate positions in the lens when wearing the lens with an horizontal gaze, consequently indicating the height of a zone means the maximum distance between two vertical points of said zone when the lens is wear likewise.

The lens 1 of FIG. 1 is an improved single vision lens following an embodiment of the present invention. The lens 1 comprises a front surface 2 and a back surface 3.

Figure 1A:
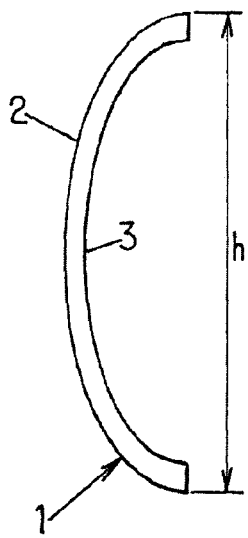
FIGS. 1a to c are schematic views of an improved single lens according to the present invention.
Figure 1B:
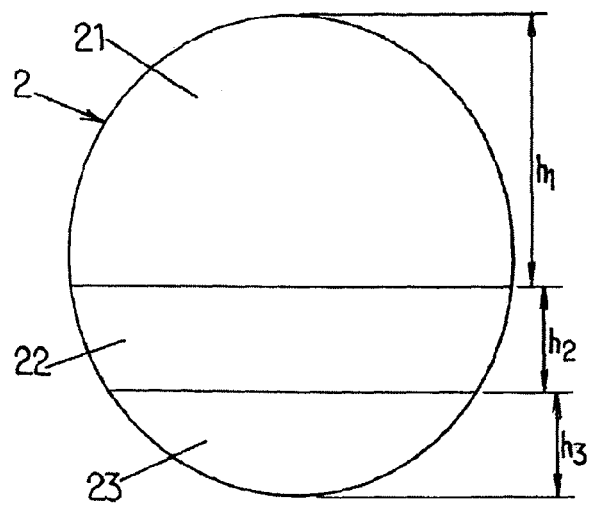
Figure 1C:
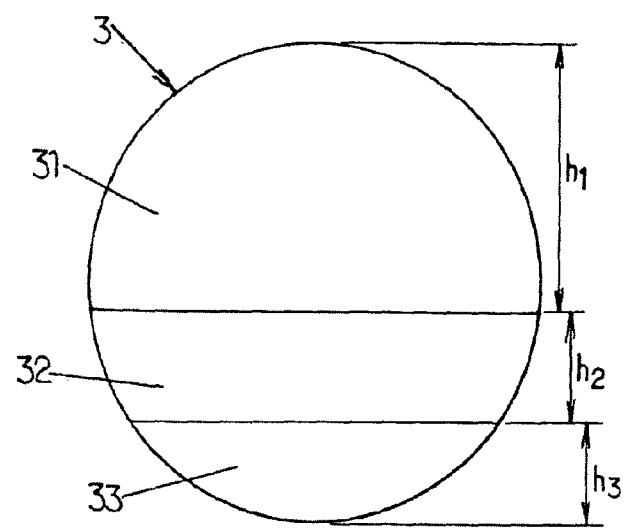

FIG. 1a shows a schematic side view of the lens 1, FIG. 1b shows a schematic front view of the front surface 2 of lens 1 and FIG. 1c shows a schematic front view of the back surface 3 of lens 1.

The front surface 2 comprises three top to bottom successive zones 21, 22, 23 where 21 and 23 are zones of constant curvature and curvature of bottom zone 23 is higher than curvature of top zone 21 and where the curvature of intermediate zone 22 is continuously increasing from the curvature value of top zone 21 at the interface between zones 21 and 22 to the curvature value of bottom zone 23 at the interface between zones 22 and 23.

The back surface 3 comprises three top to bottom successive zones 31, 32, 33 where 31 and 33 are zones of constant curvature and curvature of bottom zone 33 is higher than curvature of top zone 31 and where the curvature of intermediate zone 32 is continuously increasing from the curvature value of top zone 31 at the interface between zones 31 and 32 to the curvature value of bottom zone 33 at the interface between zones 32 and 33.

The height $h_1$ of top zone 21 of the front surface 2 is the same as the height $h_1$ of the top zone 31 of back surface 3.

The height $h_2$ of intermediate zone 22 of the front surface 2 is the same as the height $h_2$ of intermediate zone 32 of back surface 3.

The height $h_3$ of bottom zone 23 of the front surface 2 is the same as the height $h_3$ of bottom zone 33 of back surface 3.

The total lens height is h, where $h=h_1+h_2+h_3$ For example h=60 mm, $h_1$=35 mm, $h_2$=7 mm, $h_3$=18 mm.

Following an embodiment of the present invention, front surface 2 and back surface 3 are aligned to each other, such that the effective power of the lens as measured by ray tracing analysis is constant everywhere.

Example 1 is an improved single vision lens which has an overall spherical power of −2.0 Diopters, with both surfaces having curvatures that vary across the optical surface, as shown in FIGS. 1b and 1c. The two surfaces of the lens are aligned to each other, such that the effective power of the lens as measured by ray tracing analysis is −2.0 Diopters everywhere.

Example 2 is an improved single vision lens which has an overall power of 0.0 Diopter (plano). It is known that even emmetropic persons who do not vision correction may need image magnification in order to comfortably read fine print or perform tasks that require fine resolution at near distances.

The improved plano single vision lens depicted in example 2 is made up by combining to progressive addition surfaces, one with progressive addition power (front surface) and the other with regressive power (back surface). The power profile of these two surfaces may be adjusted so that the change in spherical power of the resulting lens is held to a value below a nominal limit. For example, it is possible to use a progressive addition surface with a 2.00 Diopters add power and a regressive surface with a 2.00 Diopters power to create the single improved vision lens of example 2. In this lens, the front surface curvature ranges from 2.00 Diopters to 4.00 Diopters, with the relatively steep zone being disposed along a central meridian, so that the steepening curvature profile matches the change in gaze direction as the eye moves from a distant target to a near target.

The increase in magnification (per cent increase in SM) for such a lens (made of a material of refractive index 1.50) is going from the zone where the curvature of the front surface is 2.00 Diopters to the zone where the curvature is 4.00 Diopters is 0.5%, ignoring the slight increase in vertex distance. The impact of base curve steepening on spectacle magnification is more pronounced when the single vision lens provides a correction. For example, for a plus 4.00 Diopters improved single lens, the front curve might be 6.00 Diopters and the back curve 2.00 Diopters. If the near vision zone is steepened by 2.00 Diopters, then the increase in SM is from 1.068 to 1.088, i.e. from 6.8% to 8.8%, or 30%.

This effect is very beneficial for myopes, since the single vision lens providing refraction corrections to myopes leads to spectacle lens magnification of less than 1.0 Diopter. This is known in the art as image minification. For example, a minus lens (−1.50 Diopter) with a 13 mm vertex distance and a front curve of 3.5 Diopters made of a material of refractive index 1.50 is 0.9875, so that the per cent SM is

%  SM=−1.25

Example 3 is an improved single vision lens constructed by joining two progressive addition surfaces, the front surface with a 3.50 Diopters base curve and a 2.00 Diopters add power zone and the back being a 5.00 Diopters base curve with a 2.00 Diopters regressive power. The near vision zone of this lens provides a spherical correction of −1.50 Diopters, with a front curve of 5.00 Diopters. The SM at the near vision zone is 0.9905, so that the per cent SM is %  SM=−1.0(n=1.50)

reducing image minification by 20% compared with the far vision zone.

Therefore, it is proved that image magnification is enhanced or image minification is reduced in all types of single vision lenses (plus, plano or minus) by increasing the front curve of the lens on that portion of the lens surface that is used for viewing near objects. This approach of providing a gradient (or an abrupt) increase in lens curvature at the lower portion of the optic, or that portion of the optic that is used for viewing near objects will lead to enhanced visual comfort and better resolution (e.g., contrast sensitivity) while reading, or performing other tasks that require fine resolution.

The increase in spectacle lens magnification may also be achieved by providing a small amount of add power (increased sphere power) at the lower portion of the optic, or the near vision zone. The magnitude of this increase in spherical correction should be limited so that the resulting defocus or image blurring is not noticeable, or is indeed below the level of perception. Typically, an add power 0.10-0.50 Diopter, and preferably of 0.10-0.30 Diopter does not cause a change in visual acuity, but provides a small increase in spectacle lens magnification. For example, an add power of 0.15 Diopter with a front curve of 5.00 Diopters in a plano lens provides an SM of 1.012 or a per cent SM of 1.2 approximately, while an add power of 0.30 Diopter provides an SM of 1.014, assuming that the lens material has an index of 1.50. Table 1 shows the values of SM for a range of single vision lenses. It is assumed that the material has a refractive index of 1.50, the edge thickness of plus lenses is 1.0 mm and center thickness of plano and minus lenses is 2.00 mm. Lens thickness were recomputed for the new front curves in Table 1 which shows the changes in SM with lens power and front curvature.

"Thickness @ OC" is the thickness of the lens measured at the optical center of the lens.

"Near curve" is the maximum curvature of the front surface lower zone with top to bottom increasing curvature, used for lenses according to the present invention.

The curvature of the back surfaces of Examples A to E, according to the invention is designed so that the effective power of the whole lens is constant.

The curvature of the back surfaces of Examples F and G, according to the invention is designed so that the effective power of the main part of the lens is constant and the maximum difference of the effective power of the lower part of the lens and the effective power of the upper part of the lens is 0.15 Diopter.

The curvature of the back surfaces of Examples H and I, according to the invention is designed so that the effective power of the main part of the lens is constant and the maximum difference of the effective power of the lower part of the lens and the effective power of the upper part of the lens is 0.30 Diopter.

Table 1 makes possible to compare the spectacle magnification SM of prior art lenses with lenses according to the present invention.

Table 2 shows the difference in per cent SM values for each of the examples in Table 1 and the increase in Per Cent SM by changing front curvatures of single vision lenses and providing them with moderate values of add power.

TABLE 2

| Example | SM, Prior Art | SM invention | Diff (% SM) |
|---|---|---|---|
| A | 1.114 | 1.126 | 1.2 |
| B | 1.022 | 1.026 | 0.4 |
| C | 1.008 | 1.012 | 0.4 |
| D | 0.991 | 0.995 | 0.4 |
| E | 0.933 | 0.936 | 0.3 |
| F | 1.007 | 1.013 | 0.6 |
| G | 1.067 | 1.072 | 0.5 |
| H | 1.005 | 1.014 | 0.9 |
| I | 0.959 | 0.967 | 0.8 |

It is known that the wearers of spectacle lenses can visually perceive a binocular difference of 0.75% to 1% in per cent SM. It is expected that a difference of 0.5% or more is preferably chosen to provide a significant improvement in visual function. This lower limit of efficacy will correspond to either an increase of 2.50 Diopters or more in the front curve is

TABLE 1

| Example | Front curve, Diopter | Back curve, Diopter | Spherical Power, Diopter | Thickness mm@OC | SM, Prior Art | Near Curve Diopter | Add Power, Diopter | SM invention |
|---|---|---|---|---|---|---|---|---|
| A | 7.50 | 2.50 | +5.00 | 5.87 | 1.114 | 9.50 | 0 | 1.126 |
| B | 5.00 | 4.00 | +1.00 | 1.95 | 1.022 | 7.75 | 0 | 1.026 |
| C | 6.00 | 6.00 | 0.00 | 2.00 | 1.008 | 9.00 | 0 | 1.012 |
| D | 4.00 | 5.00 | −1.00 | 2.00 | 0.991 | 7.00 | 0 | 0.995 |
| E | 2.00 | 7.00 | −5.00 | 2.00 | 0.933 | 4.50 | 0 | 0.936 |
| F | 5.00 | 5.00 | 0.00 | 2.00 | 1.007 | 7.75 | 0.15 | 1.013 |
| G | 7.00 | 4.00 | +3.00 | 3.95 | 1.067 | 8.00 | 0.15 | 1.072 |
| H | 4.00 | 4.00 | 0.00 | 2.00 | 1.005 | 7.00 | 0.30 | 1.014 |
| I | 2.00 | 5.00 | −3.00 | 2.00 | 0.959 | 4.75 | 0.30 | 0.967 |

"Prior Art" examples refer to single vision lens where both front and back surfaces have a constant curvature, referred respectively as "front curve" and "back curve" in table 1.

The "spherical power" corresponds to resulting effective power of the main part of the lens.

preferred for plano or minus lenses, or an add power to be provided at the level of 0.15 Diopters to 0.30 Diopters. The requirements are less stringent for plus lenses, which show significant improvement in per cent SM when the front curve is steepened by 2.00 Diopters with no provision for add power. The most effective combination is to provide both means to increase per cent SM. Maintaining the add power to a value less than or equal to 0.30 Diopter will ensure that the unwanted astigmatism that develops as a consequence of providing the add power will be less or equal to 0.25 Diopter, and may be pushed outward where it can not interfere with direct gaze in any eye position. The steepening of the front curve (without providing an add power) will also introduce surface astigmatism on the front surface. The effect of this surface astigmatism will be apparent in causing image distortion, unless it is compensated by providing a complementary curve on the back surface. In single vision lenses with net spherical power, it is not possible to provide a complete neutralization of the added spherical power as well as astigmatism. A high quality design of the overall lens may be derived by performing a simultaneous optimization of both surfaces using an algorithm that compute retinal image distortion by performing ray tracing analysis through multiple points of the lens optic, with the lens positioned in an "as worn" position.

A method for defining a lens by optimizing the optical characteristics of the lens is disclosed in patent document U.S. Pat. No. 6,318,859 to T. Baudart et al. which is enclosed by reference, where optical characteristics are calculated during optimization using a ray tracing program, under wearing conditions. Said method is suitable to perform a simultaneous optimization of both surfaces according to the present invention.

Another method suitable to perform a simultaneous optimisation of both surfaces according to the invention is disclosed in following publication: "Applications of optimization in computer-aided ophthalmic lens design"—P. Allione, F. Ahsbahs and G. Lessaux—SPIE Vol. 3737—p. 138-148 (May 1999).

Still another suitable method is disclosed in patent application PCT/IB2006/003220.

In addition, those of ordinary skill in the art will perceive that changing vertex distance or changing pantoscopic tilts may also provide some relief when needed.

This concept may be applied to both spherical and toric single vision lenses. The value of the spectacle lens magnification is preferably computed in every meridian, since the power (effective power or spherocylindrical power) will be different at each meridian. The increase in SM between state of the art designs and designs disclosed in this invention will be proportionately the same as the front curve is altered or when moderate add power is provided.

In addition to other design elements described above the surfaces of the single vision optic may be further enhanced by rendering them aspheric. Advantages of using aspheric surfaces include a wider field of view, and reduced thickness of plus lenses.

The fabrication of these novel single vision lenses requires the use of state of the art lens machining or molding technology. The steepening of the front curve of the increase in spherical power is preferably provided at the inferior portion of the optic. The optic design is relatively insensitive to the precise orientation of the central meridian of the altered zone. Therefore, it may be possible to cover all possible values of the axis of the prescribed cylinder with two possible orientations of the altered zones, such as inferior nasal and inferior temporal. In some case, the front curve will have a highly complex, non symmetric form, and is preferably provided by molding or casting a blank against an optical tool embodying this geometry, or using a free form machining process. Every spectacle lens material may be used in the frame of the present invention such as non limiting materials known under commercial references <<ORMA>>, <<PC>>, <<MR8>>, <<MR7>>, <<1.74>>.

The invention has been described above with the aid of embodiments without limitation of the general inventive concept which is evident from the claims and the general portion of the specification.

The invention claimed is:

1. An improved single lens comprising:
   a front and a back surfaces, at least a portion of both the front surface and the back surface having a continuous change in lens curvature going downwards;
   an upper part which front and back surfaces are top zones of front and back surfaces, covering at least the half of respectively front and back surfaces, and where the two top zones are aligned to each other such that the effective power of the upper part of the lens is constant;
   a lower part used for viewing near objects which front and back surfaces are lower zones of front and back surfaces, the front and back lower zones comprising each a surface zone where top to bottom increasing curvature of each surface zone is provided and where the front and back lower zones are aligned to each other such that the maximum difference of the effective power of the lower part of the lens and the effective power of the upper part of the lens is comprised between 0 and 0.5 Diopter.

2. The improved single lens of claim 1 where the maximum difference of effective power of the lower part of the lens and the effective power of the upper part of the lens is equal or less to 0.3 Diopter.

3. The improved single lens of claim 1 where front and back surfaces are aligned to each other such that the effective power of the whole lens is constant.

4. The improved single lens according to claim 1 where the front and back lower zones comprise each an intermediate zone and a bottom zone, where the curvature of both front and back intermediate zones follows a top to down increasing curvature gradient.

5. The improved single lens according to claim 4 where the gradient in surface curvature is less or equal to 3 Diopters.

6. The improved single lens according to claim 4 where the bottom zones are zones of constant focal power.

7. The improved single lens according to claim 4 where the height $h_1$ of top zone, the height $h_2$ of intermediate zone, the height $h_3$ of bottom zone of the front surface are respectively equal to the height $h_1$ of top zone, the height $h_2$ of intermediate zone, the height $h_3$ of bottom zone of the back surface.

8. The improved single lens according to claim 7 where $h_1$ is comprised between 50 to 70% of the total height h of the lens, $h_2$ is comprised between 5 to 20% of the total height h of the lens, $h_3$ is comprised between 20 to 40% of the total height of the lens.

9. The improved single lens according to claim 1 where one of the front and back surfaces is a progressive surface and the other of the front and back surfaces is a regressive surface, the front and back surfaces comprising each a top far vision zone, an intermediate vision zone and a bottom near vision zone.

10. The improved single lens according to claim 1 where at least one of the front surface and the back surface of the lens includes at least a portion that is spherical or toric or aspheric.

11. The improved single lens according to claim 1 where the lens is a minus lens for nearsightedness correction with negative effective power.

12. The improved single lens according to claim 1 where the lens is a plano lens with 0 Diopter effective power.

13. The improved single lens according to claim 1 where the lens is a plus lens for farsightedness correction with positive effective power.

* * * * *